United States Patent [19]
Kawase et al.

[11] Patent Number: 6,054,403
[45] Date of Patent: Apr. 25, 2000

[54] SEMICONDUCTIVE CERAMIC AND SEMICONDUCTIVE CERAMIC ELEMENT USING THE SAME

[75] Inventors: Yoichi Kawase, Omihachiman; Akinori Nakayama, Otsu; Satoshi Ueno, Omihachiman; Terunobu Ishikawa, Shiga-ken; Hideaki Niimi, Hikone, all of Japan

[73] Assignee: Murata Manufacturing Co., Ltd., Japan

[21] Appl. No.: 09/174,212

[22] Filed: Oct. 16, 1998

[30] Foreign Application Priority Data

Oct. 21, 1997 [JP] Japan ................................. 9-288749

[51] Int. Cl.$^7$ ............................ H01B 1/08; C04B 35/50; H01C 7/10; H03B 5/12

[52] U.S. Cl. ...................... 501/152; 501/126; 252/521.1; 252/521.2; 338/225 D; 331/107 R; 331/158

[58] Field of Search ............................. 252/521.1, 521.2; 501/126, 152; 338/22 R, 225 D; 331/107 R, 158

[56] References Cited

U.S. PATENT DOCUMENTS 5,703,000 12/1997 Nakayama et al. ..................... 501/152
5,858,902 1/1999 Ishikawa et al. ....................... 501/152

FOREIGN PATENT DOCUMENTS

0609888A1 8/1994 European Pat. Off. .
0789366A2 8/1997 European Pat. Off. .

OTHER PUBLICATIONS

"Magnetic and Electrical Properties of Cu Substituted $La_{1-x}Ca_xCoO_3$ Crystals"; *Journal of Magnetism and Magnetic Materials*; Ch. Zock, et al.; 150 (1995) Oct., No. 2, Amsterdam, NL; pp. 253–262.

"Magnetoresistance in $La_{1-x}Sr_xCoO_3$ for $0.05 \leq \chi \leq 0.25$"; *The American Physical Society*; Vladimir Golovanov, et al.; Apr. 1, 1996 I; pp. 8207–8210.

"Synthesis of $(La,Sr)CoO_3$ Perovskite Films via a Sol–gel Route and Their Physicochemical and Electrochemical Surface Characterization for Anode Application in Alkaline Water Electrolysis"; *J. Chem. Soc., Faraday Trans.*; Ravidra N.Singh, et al.; 1996, 92(14); pp. 2593–2598.

*Primary Examiner*—Mark Kopec
*Attorney, Agent, or Firm*—Ostrolenk, Faber, Gerb & Soffen, LLP

[57] ABSTRACT

A semiconductive ceramic in which the B constant is maintained at about 4000 K or more at elevated temperature to thereby decrease power consumption, and the B constant is lowered less than 4000 K at low temperature so as to avoid unnecessary increase of resistance; as well as a semiconductive ceramic element using the same. The semiconductive ceramic is formed of a lanthanum cobalt oxide, which serves as the primary component, and, as a secondary component, at least one oxide of Li, Na, K, Rb, Cs, Be, Mg, Ca, Sr, Ba, Ni, Cu and Zn. The semiconductive ceramic element is fabricated through use of the semiconductive ceramic and an electrode formed thereon.

16 Claims, No Drawings

SEMICONDUCTIVE CERAMIC AND SEMICONDUCTIVE CERAMIC ELEMENT USING THE SAME

BACKGROUND OF THE INVENTION

1. Field of the Invention

The present invention relates to a semiconductive ceramic, more specifically to a semiconductive ceramic having negative resistance-temperature characteristics. The present invention also relates to a semiconductive ceramic element making use of the semiconductive ceramic.

2. Background Art

Semiconductive ceramic elements having high resistance at ambient temperature and negative resistance-temperature ("NTC") characteristics by which resistance decreases with increase of temperature (such an element having NTC characteristics hereinafter called an "NTC element") are known. Through utilization of the NTC characteristics, the NTC element has been used for various purposes such as the suppression of rush current, retarding starting of a motor, and protection of halogen lamps.

For example, a NTC element rush current device suppresses overcurrent by absorbing the initial rush current, so as to prevent destruction of a halogen lamp or a semiconductive element such as an IC or diode due to overcurrent flowing through a circuit upon the switching-on of the power, and to prevent a decrease in service life of such a component. Thereafter, the NTC element reaches high temperature through self-heating so that its resistance decreases and, in a steady state, power consumption is reduced accordingly.

When current is passed through a motor for a gear mechanism—the motor being designed to be fed with a lubricating oil after starting of the motor—so as to rotate the gears immediately at a high rotational speed, the gears may be damaged due to insufficient supply of the lubricating oil. Also, in a lapping machine which grinds the surface of a ceramic through rotation of a grinding stone, the ceramic may be cracked when the lapping machine is rotated at a high rotational speed upon starting of the drive motor. In order to avoid these problems, the terminal voltage of the motor is lowered by means of an NTC element, so as to retard the starting of the motor. Thereafter, the NTC element comes to have lowered resistance through self-heating, so that the motor runs normally in a steady state.

As a semiconductive ceramic having NTC characteristics and constituting these NTC elements, there has been used spinel composite oxides containing a transition metal element such as Mn, Co, Ni or Cu.

Lanthanum cobalt oxides have been reported to have NTC characteristics such that the B constant has temperature dependency; that is, the B constant increases with increase of temperature (V. G. Bhide and D. S. Rajoria at al. Phys. Rev. B6, [3], 1072, 1972, etc.).

When an NTC element is used for suppression of rush current, it must have a decreased resistance at the elevated temperature caused by self-heating. However, the conventional semiconductive ceramic using a spinel composite oxide usually has a tendency that the B constant decreases as resistance decreases. Therefore, at an elevated temperature the resistance cannot be sufficiently lowered, with the result that power consumption is not reduced in a steady state.

Also, in a conventional semiconductive ceramic, resistance increases considerably at low temperatures below 0° C., resulting in a voltage drop which retards the start-up of an apparatus or machine.

A conventional semiconductive ceramic element making use of conventional lanthanum cobalt oxide has a B constant of as high as 6000 K at an elevated temperature. However, since it has a B constant of 4000 K or more at low temperature, when used as an NTC element for suppression of rush current, the apparatus or machine to which the element is incorporated suffers a considerable voltage drop at low temperature.

SUMMARY OF THE INVENTION

Accordingly, an object of the present invention is to provide a semiconductive ceramic in which the B constant is maintained at about 4000 K or more at elevated temperature to thereby decrease power consumption, and the B constant is lowered at sufficiently low temperature so as to increase resistance more than required to thereby prevent a voltage drop in an apparatus or machine.

Another object of the present invention is to provide a semiconductive ceramic element using the semiconductive ceramic.

To achieve the above objects, according to a first aspect of the present invention, there is provided a semiconductive ceramic comprising a lanthanum cobalt oxide as a primary component, and, as a secondary component, at least one oxide of an element selected from the group consisting of Li, Na, K, Rb, Cs, Be, Mg, Ca, Sr, Ba, Ni, Cu and Zn. With this composition, the B constant is maintained above about 4000 K at an elevated temperature, and thus the resistance of the semiconductive ceramic is lowered, leading to a reduction in power consumption. At low temperature, on the other hand, the B constant becomes sufficiently lower so that the resistance of the semiconductive ceramic increases to a proper level as to prevent an overcurrent from flowing through an apparatus or machine, to thereby prevent unnecessary retarding of start-up of the apparatus or machine.

Preferably, the semiconductive ceramic contains the oxide serving as a secondary component in an amount of about 0.001–1 mol % calculated as the element. Through incorporation of the secondary component(s) in such an amount, the B constant is 4000 K or lower at low temperature, to thereby more effectively mitigate a drastic increase in resistance of the semiconductive ceramic.

Preferably, the aforementioned lanthanum cobalt oxide is $La_xCoO_3$ ($0.5 \leq x \leq 0.999$). With this composition, there can be obtained a semiconductive ceramic having excellent NTC characteristics.

Preferably, a portion of $La_xCoO_3$ is substituted with at least one element selected from among Pr, Nd and Sm. With this substitution, there can be obtained a semiconductive ceramic having excellent NTC characteristics.

According to a second aspect of the present invention, there is provided a semiconductive ceramic element which comprises a semiconductive ceramic comprising lanthanum cobalt oxide as a primary component, and, as a secondary component, at least one oxide of an element selected from the group consisting of Li, Na, K, Rb, Cs, Be, Mg, Ca, Sr, Ba, Ni, Cu and Zn; and an electrode formed on the ceramic. With this structure, the B constant is maintained above about 4000 K at elevated temperature, and thus the resistance of the semiconductive ceramic is lowered, leading to lowered power consumption. Further, the B constant is sufficiently lowered at low temperature, and thus the resistance of the semiconductive ceramic is increased to a proper level as to prevent an overcurrent from flowing through an apparatus or machine, to thereby prevent unnecessary retarding of start-up of the apparatus or machine.

Preferably, the semiconductive ceramic contains the oxide serving as a secondary component in an amount of about 0.001–1 mol % as the element. Through incorporation of the secondary component in such an amount, the B constant is 4000 K or less at low temperature, to thereby more effectively mitigate a drastic increase in resistance of the semiconductive ceramic.

Preferably, the lanthanum cobalt oxide is $La_xCoO_3$ ($0.500 \leq x \leq 0.999$). With this composition, there can be obtained a semiconductive ceramic element having excellent NTC characteristics.

Preferably, a portion of the aforementioned $La_xCoO_3$ is substituted with at least one element selected from among Pr, Nd and Sm. With this composition, there can be obtained a semiconductive ceramic element having excellent NTC characteristics.

The preferred uses of the semiconductive ceramic element of the present invention encompass suppression of rush current, retarding of starting of a motor, protection of halogen lamps, and use as a temperature-compensated crystal oscillator. When used in such applications, the characteristics of the semiconductive ceramic element of the present invention are more fully exploited.

DESCRIPTION OF THE INVENTION AND PREFERRED EMBODIMENTS

Now will be described a process for manufacturing the semiconductive ceramic of the present invention and a semiconductive ceramic element using the ceramic.

First, $La_xCoO_3$ and $Co_3O_4$ were provided as starting materials and weighed so as to adjust the mole ratio of lanthanum to cobalt as desired, to thereby obtain a powder. If necessary, some portion of the La may be substituted with a rare earth metal such as Pr, Nd or Sm. Such substitution is conventional in the art. Subsequently, at least one element selected from the group consisting of Li, Na, K, Rb, Cs, Be, Mg, Ca, Sr, Ba, Ni, Cu and Zn was weighed to a predetermined amount in the form of, for example, an oxide, and incorporated into the powder, to thereby obtain an additive.

The thus-obtained additive was wet-mixed along with pure water and nylon balls for 24 hours, followed by drying. The resultant mixture was calcined at 900–1200° C. for two hours, to thereby obtain a calcined material.

Next, the calcined material was mixed with a binder and nylon balls. The mixture was subjected to filtration, drying, and then press-forming into a disk shape, to thereby obtain a compact.

The compact was calcined at 1200–1600° C. for two hours in air, to thereby obtain a semiconductive ceramic.

Subsequently, a silver-palladium paste was applied onto both surfaces of the semiconductive ceramic, and the semiconductive ceramic was baked at 800–1200° C. for five hours to form external electrodes, to thereby obtain a semiconductive ceramic element.

EXAMPLE 1

According to the above-mentioned method, there were manufactured semiconductive ceramic elements containing lanthanum cobalt oxide ($La_{0.94}CoO_3$) as the primary component, and different types and amounts of secondary components. The resistivity and B constant of each semiconductive ceramic element were measured. The results are shown in Table 1. Data from semiconductive ceramic elements in which a plurality of oxides were employed as secondary components are shown in Table 2. In the Tables, "o" represents good characteristics with no problems in practical use, and "Δ" represents somewhat poor characteristics but no problems in practical use.

Resistivity ($\rho$) was measured at 25° C. B constant represents the change of resistance induced by the change of temperature and is defined by the following equation, wherein resistivity $\rho(T)$ is the resistivity at temperature T, resistivity $\rho(T_0)$ is the resistivity at temperature $T_0$, and in is natural logarithm.

$$B \text{ constant} = \{ln\rho(T_0) - ln\rho(T)\}/(1/T_0 - 1/T)$$

As the B constant increases, there is an increase in the change of resistance induced by the change of temperature. According to this equation, the B constants determined in Example 1, i.e. B(−10° C.) and B(140° C.), are defined as follows:

$$B(-10° C.) = \frac{ln\rho(-10° C.) - ln\rho(25° C.)}{\frac{1}{10 + 273.15} - \frac{1}{25 + 273.15}}$$

$$B(140° C.) = \frac{ln\rho(140° C.) - ln\rho(25° C.)}{\frac{1}{140 + 273.15} - \frac{1}{25 + 273.15}}$$

TABLE 1

| Sample No. | Added element Species | Amount (mol %) | Resistivity $\rho$ 25° C. ($\Omega \cdot cm$) | B constant B (−10° C.) (K) | B constant B (140° C.) (K) | Evaluation |
|---|---|---|---|---|---|---|
| 1 | Ca | 0.0001 | 15.7 | 4360 | 6010 | Δ |
| 2 | Ca | 0.0005 | 14.8 | 4170 | 5800 | Δ |
| 3 | Ca | 0.001 | 14.1 | 3950 | 5570 | ○ |
| 4 | Ca | 0.005 | 13.3 | 3800 | 5320 | ○ |
| 5 | Ca | 0.01 | 12.6 | 3760 | 5130 | ○ |
| 6 | Ca | 0.05 | 11.9 | 3680 | 4880 | ○ |
| 7 | Ca | 0.1 | 11.4 | 3460 | 4570 | ○ |
| 8 | Ca | 0.5 | 10.8 | 3330 | 4270 | ○ |
| 9 | Ca | 1 | 9.9 | 3090 | 4060 | ○ |
| 10 | Ca | 2 | 7.7 | 2700 | 3800 | Δ |

TABLE 1-continued

| Sample No. | Added element Species | Amount (mol %) | Resistivity ρ 25° C. (Ω · cm) | B constant B (−10° C.) (K) | B constant B (140° C.) (K) | Evaluation |
|---|---|---|---|---|---|---|
| 11 | Li | 0.1 | 11.7 | 3510 | 4590 | ○ |
| 12 | Na | 0.1 | 11.7 | 3500 | 4590 | ○ |
| 13 | K | 0.1 | 11.6 | 3500 | 4590 | ○ |
| 14 | Rb | 0.1 | 11.4 | 3470 | 4570 | ○ |
| 15 | Cs | 0.1 | 11.5 | 3480 | 4570 | ○ |
| 16 | Be | 0.1 | 11.4 | 3460 | 4580 | ○ |
| 17 | Mg | 0.1 | 11.5 | 3470 | 4580 | ○ |
| 18 | Sr | 0.1 | 11.5 | 3470 | 4580 | ○ |
| 19 | Ba | 0.1 | 11.4 | 3460 | 4580 | ○ |
| 20 | Ni | 0.1 | 11.5 | 3470 | 4590 | ○ |
| 21 | Cu | 0.1 | 12 | 3460 | 4570 | ○ |
| 22 | Zn | 0.1 | 11 | 3460 | 4570 | ○ |
| Comparative Example | — | — | 0 | 17 | 4410 | 6270 | — |

TABLE 2

| Sample No. | Added element Species | Amount (mol %) | Resistivity ρ 25° C. (Ω · cm) | B constant B (−10° C.) (K) | B constant B (140° C.) (K) | Evaluation |
|---|---|---|---|---|---|---|
| 23 | Na<br>Mg | 0.001<br>0.0005 | 14.0 | 3920 | 5500 | ○ |
| 24 | K<br>Zn | 0.005<br>0.001 | 13.1 | 3790 | 5260 | ○ |
| 25 | Cu<br>Ni | 0.01<br>0.01 | 12.0 | 3730 | 5090 | ○ |
| 26 | Ba<br>Zn | 1.0<br>0.5 | 8.9 | 2780 | 3940 | Δ |
| 27 | Ca<br>Ba<br>Li | 0.05<br>0.05<br>0.05 | 11.3 | 3430 | 4480 | ○ |
| 28 | Sr<br>Ni<br>Mg | 0.1<br>0.1<br>0.5 | 10.3 | 3220 | 4100 | ○ |

In the semiconductive ceramic elements containing $La_{0.94}CoO_3$ as the primary component and at least one oxide of an element selected from the group consisting of Li, Na, K, Rb, Cs, Be, Mg, Ca, Sr, Ba, Ni, Cu and Zn as a secondary component, as shown in Table 1, the B constant is decreased at low temperature, while the B constant is maintained above 4000 K at high temperature.

Moreover, as shown in Table 2, even in the case where a plurality of oxides are used as the secondary components, if the total amount thereof falls within the range from about 0.001 to 1 mol %, the B constant is decreased at low temperature, while the B constant is maintained above 4000 K at high temperature.

The reasons why the above-mentioned range provides advantages in the present invention are as follows.

The amount of the secondary component(s) is restricted to about 0.001 mol % to 1 mol % because when the amount of the secondary component(s) is less than about 0.001 mol % as in the case of Sample Nos. 1 and 2, the B constant disadvantageously exceeds 4000 K at low temperature, whereas when the amount of the secondary component(s) is more than about 1 mol %, the B constant disadvantageously falls below 4000 K at high temperature.

EXAMPLE 2

In manner similar to that of Example 1, semiconductive elements were manufactured by changing the amount x of lanthanum with respect to that of cobalt in lanthanum cobalt oxide $La_xCoO_3$ serving as the primary component while fixing the secondary component to Ca and the amount of the secondary component to 0.01 mol %. The resistivity and B constant of each semiconductive ceramic element were measured. The results are shown in Table 3. Similarly, the results obtained by use of $La_xM_yCoO_3$ (M represents at least one species selected from among Pr, Nb and Sm), which is lanthanum cobalt oxide serving as the primary component of which lanthanum is partially substituted with another element, are shown in Table 4. In this case, the amount of La (i.e., x) was fixed to 0.85, and the amount of substituting element(s) (i.e., y) was fixed to 0.09. In the Tables, "○" represents good characteristics with no problems in practical use, "Δ" represents somewhat poor characteristics but no problems in practical use, and "×" represents problems in practical use.

TABLE 3

| Sample No. | Amount of La x (mol) | Added element Species | Added element Amount (mol %) | Resistivity ρ 25° C. (Ω · cm) | B constant B (−10° C.) (K) | B constant B (140° C.) (K) | Evaluation |
|---|---|---|---|---|---|---|---|
| 40 | 0.4 | Ca | 0.01 | 78.1 | 2680 | 3870 | Δ |
| 41 | 0.5 | Ca | 0.01 | 40.5 | 3070 | 4120 | ○ |
| 42 | 0.7 | Ca | 0.01 | 29.3 | 3460 | 4690 | ○ |
| 43 | 0.9 | Ca | 0.01 | 12.8 | 3740 | 5110 | ○ |
| 44 | 0.999 | Ca | 0.01 | 13.7 | 3700 | 5020 | ○ |
| 45 | 1 | Ca | 0.01 | 21.5 | 3650 | 4940 | X |

TABLE 4

| Sample No. | Amount of La x (mol) | Substituting element Species | Substituting element Amount y (mol) | Added element Species | Added element Amount (mol %) | Resistivity ρ 25° C. (Ω · cm) | B constant B (−10° C.) (K) | B constant B (140° C.) (K) | Evaluation |
|---|---|---|---|---|---|---|---|---|---|
| 46 | 0.85 | Pr | 0.09 | Ca | 0.005 | 13.5 | 3830 | 5350 | ○ |
| 47 | 0.85 | Nb | 0.09 | Ca | 0.05 | 12.0 | 3700 | 4880 | ○ |
| 48 | 0.85 | Sm | 0.09 | Ca | 0.5 | 10.9 | 3350 | 4290 | ○ |
| 49 | 0.85 | Pr Nb | 0.03 0.06 | Ca | 0.001 | 14.3 | 3960 | 5570 | ○ |
| 50 | 0.85 | Nb Sm | 0.01 0.08 | Ca | 0.01 | 12.7 | 3770 | 5150 | ○ |
| 51 | 0.85 | Pr Nb Sm | 0.03 0.03 0.03 | Ca | 0.1 | 11.4 | 3480 | 4580 | ○ |

As shown in Table 3, when the amount of lanthanum, x, with respect to 1 mol of cobalt contained in the primary component falls in the range of about 0.5–0.999 mol, the B constant at low temperature can be reduced to less than 4000 K while B constant at high temperature is maintained at 4000 K or more.

As shown in Table 4, samples in which lanthanum is partially substituted with at least one of Pr, Nb and Sm in the above-specified amount range have a B constant at low temperature be reduced to a lower value while the B constant at high temperature is maintained at about 4000 K or more.

The amount of lanthanum, x, is limited to about 0.5–0.999, since, as in the case of sample No. 40, the B constant at high temperature disadvantageously becomes 4000 or less when the amount of lanthanum, x, is less than 0.5. In contrast, as in the case of sample No. 45 having an amount of lanthanum of more than 0.999, the B constant satisfies the conditions of the present invention both at high temperature and low temperature. However, unreacted lanthanum oxide ($La_2O_3$) contained in a sintered piece of semiconductive ceramic reacts with moisture in air to result in expansion and breaking of the ceramic, which is disadvantageous for use as the element of the present invention.

As described hereinabove, the semiconductive ceramic of the present invention contains lanthanum cobalt oxide as a primary component and at least one oxide selected from the group consisting of oxides of Li, Na, K, Rb, Cs, Be, Mg, Ca, Sr, Ba, Ni, Cu or Zn as a secondary component, and thus obtains NTC characteristics by which the B constant is maintained at 4000 K or more at high temperature, while the B constant at low temperature is further decreased.

Therefore, the semiconductive ceramic enables manufacture of an excellent semiconductive ceramic element (NTC thermistor element) which has low resistance at high temperature leading to lowered power consumption, and prevents an excessive voltage drop in an apparatus or machine at low temperature.

That is, the thus-obtained semiconductive ceramic element can be widely used as an element for retarding of starting of a motor, protection of the drum of a laser printer, protection of bulbs such as halogen lamps, and elimination of rush current occurring in an apparatus or machine in which an excess current flows at the initial stage of voltage application as well as rush current occurring in a switching power, and also can be used as a temperature-compensated element for TCXO as well as that for general use, and as a temperature detection element.

What is claimed is:

1. A semiconductive ceramic comprising (a) a lanthanum cobalt oxide as the primary component, and (b) at least one oxide of an element selected from the group consisting of Li, Na, K, Rb, Cs, Be, Mg, Ca, Sr, Ba, Ni, Cu and Zn, wherein the oxide (b) is contained in an amount of about 0.001 to about 1 mol % calculated as said element thereof.

2. A semiconductive ceramic according to claim 1, wherein the lanthanum cobalt oxide is $La_xCoO_3$ and $0.5 \leq x \leq 0.999$.

3. A semiconductive ceramic according to claim 2, wherein a portion of the La of the $La_xCoO_3$ is replaced by at least one element selected from the group consisting of Pr, Nd and Sm.

4. A semiconductive ceramic according to claim 1, wherein the oxide is Ca or Cu.

5. A semiconductive ceramic according to claim 1, containing 2 or 3 of said (b) oxides.

6. A semiconductive ceramic according to claim 1, wherein the (b) oxide is in an amount of about 0.005–0.9 mol % calculated as said element thereof.

7. A semiconductive ceramic element comprising a semiconductive ceramic of claim 1 and an electrode on said ceramic.

8. A semiconductive ceramic element according to claim 7, wherein the lanthanum cobalt oxide is $La_xCoO_3$ and $0.5 \leq x \leq 0.999$.

9. A semiconductive ceramic element according to claim 8, wherein a portion of the La of the $La_xCoO_3$ is replaced by at least one element selected from the group consisting of Pr, Nd and Sm.

10. A semiconductive ceramic element according to claim 9, containing the oxide is Ca or Cu.

11. A semiconductive ceramic element according to claim 9, containing 2 or 3 of said (b) oxides.

12. A semiconductive ceramic element according to claim 9, wherein the (b) oxide is in an amount of about 0.005–0.9 mol % calculated as said element thereof.

13. A rush current suppressor containing a semiconductive ceramic element according to claim 7.

14. A device for retarding the starting of a motor containing a semiconductive ceramic element according to claim 7.

15. A device for the protection of halogen lamps containing a semiconductive ceramic element according to claim 7.

16. A temperature-compensated crystal oscillator containing a semiconductive ceramic element according to claim 7.

* * * * *